United States Patent Office 3,008,550
Patented Nov. 14, 1961

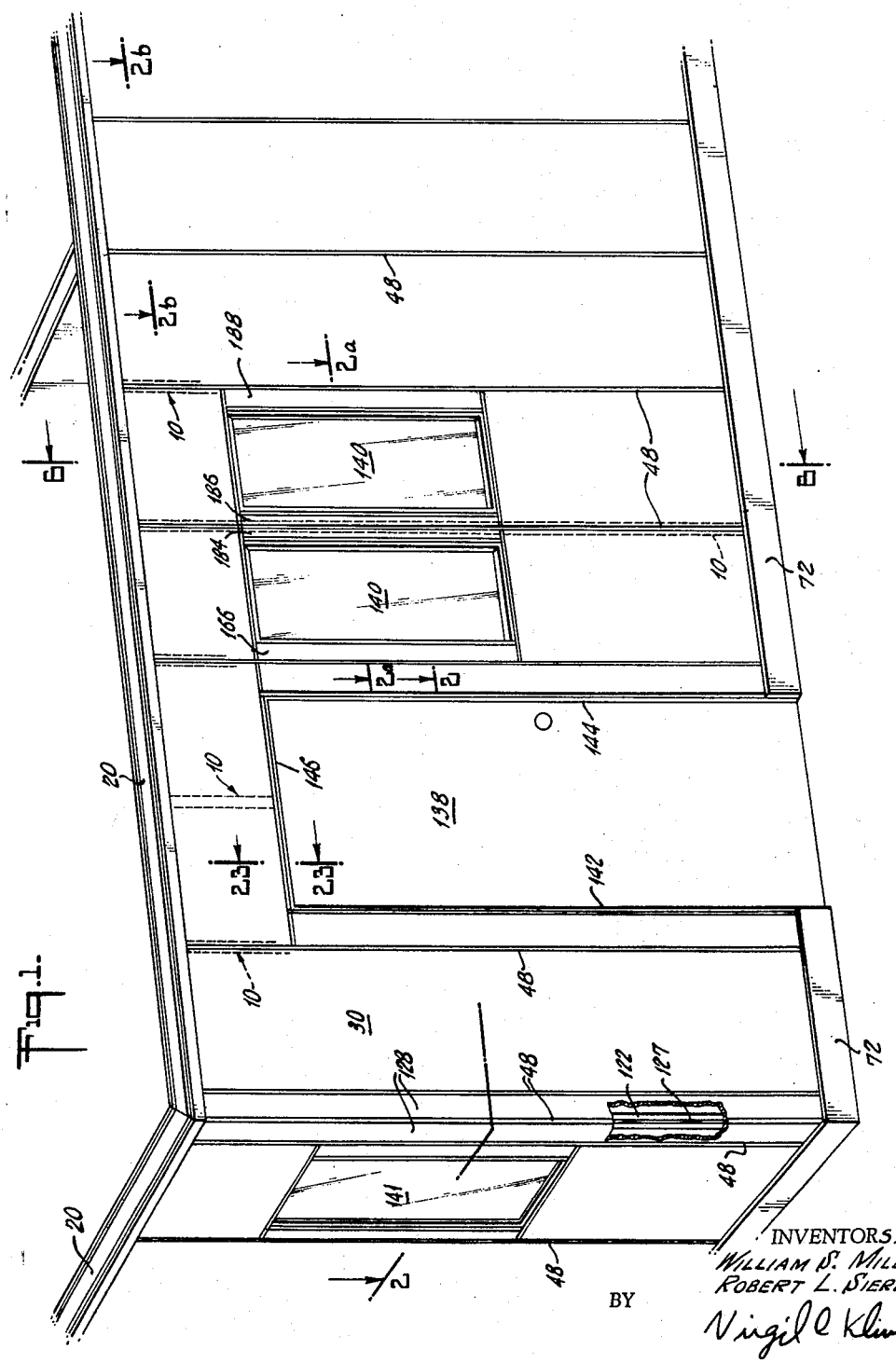

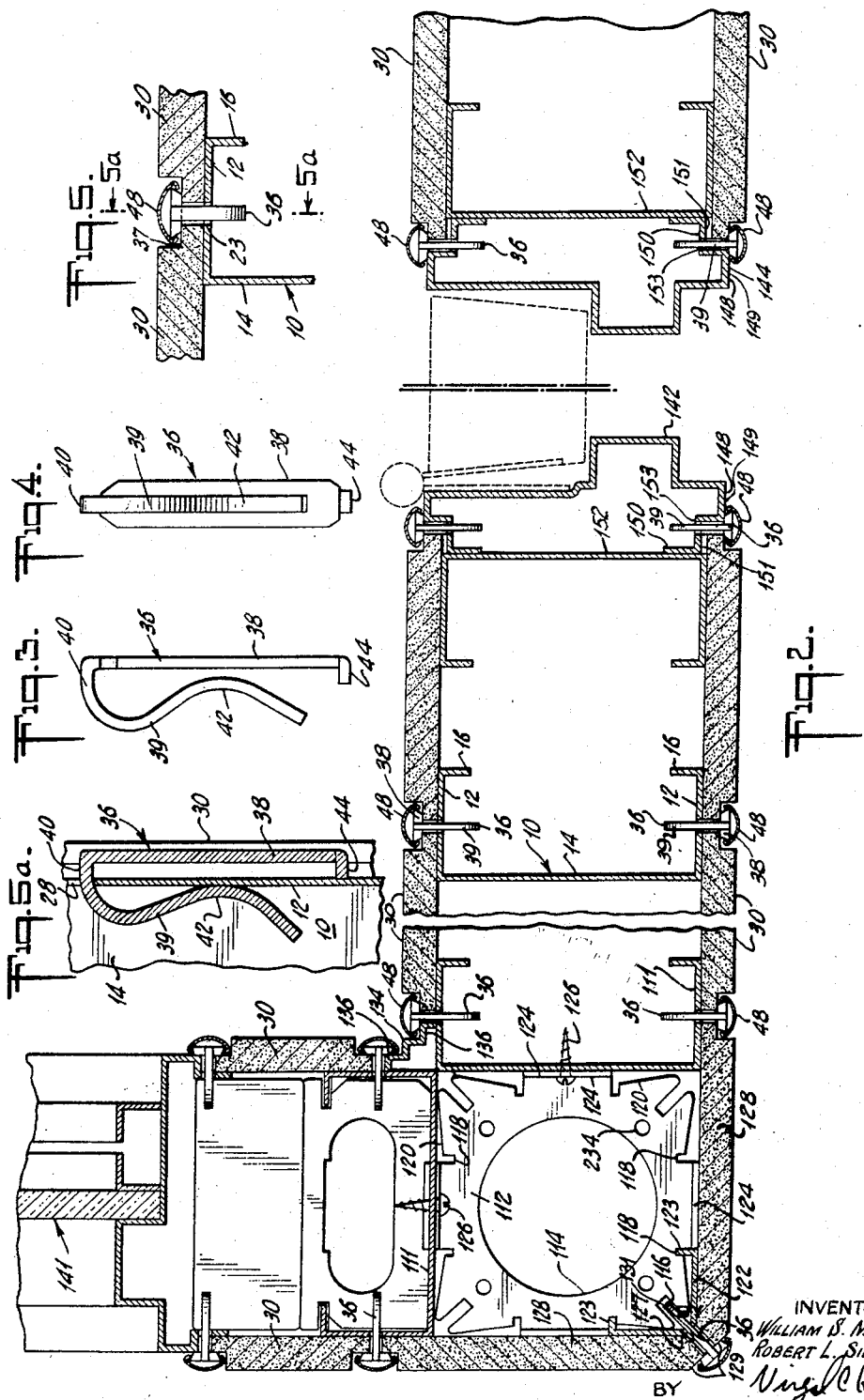

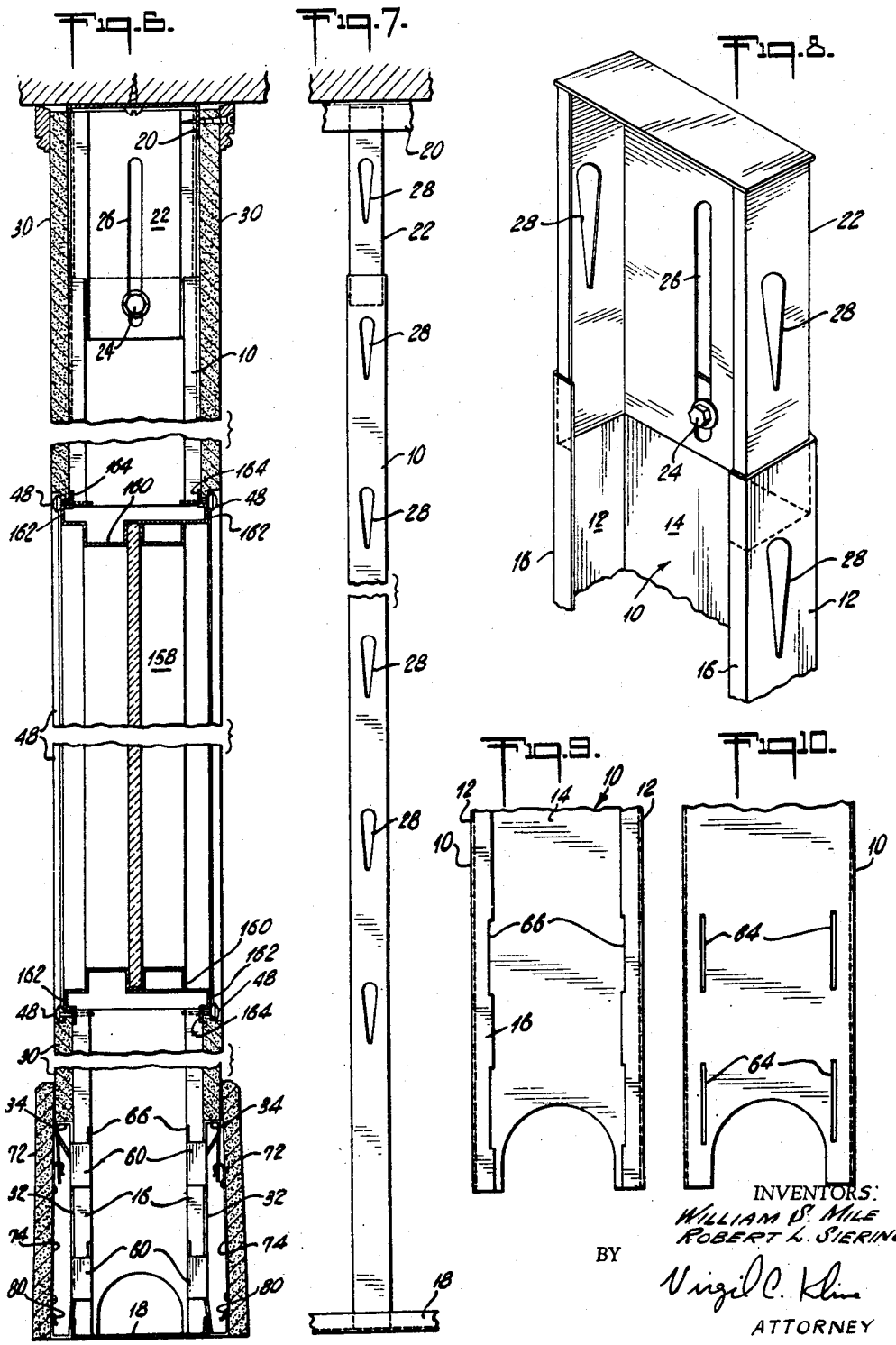

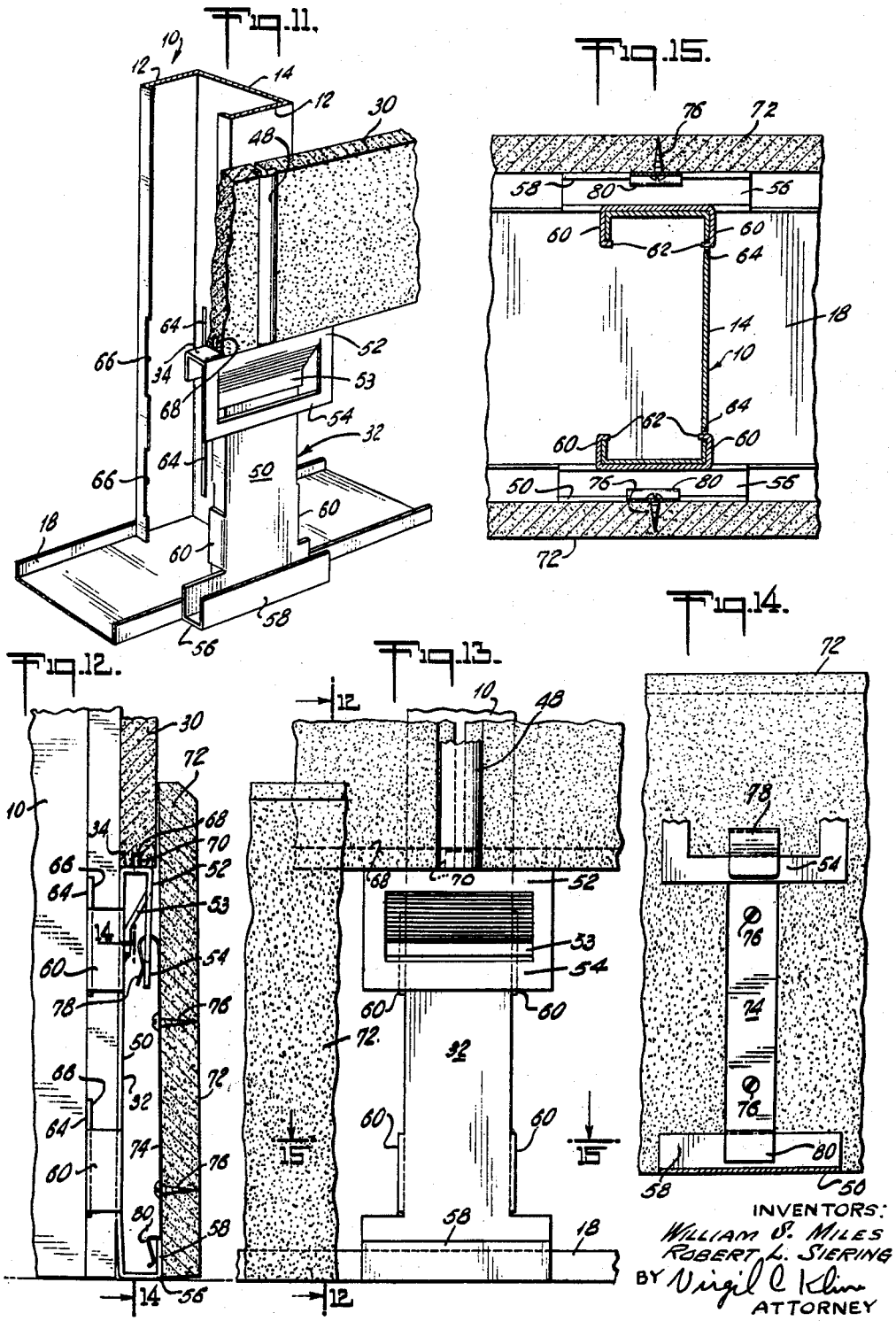

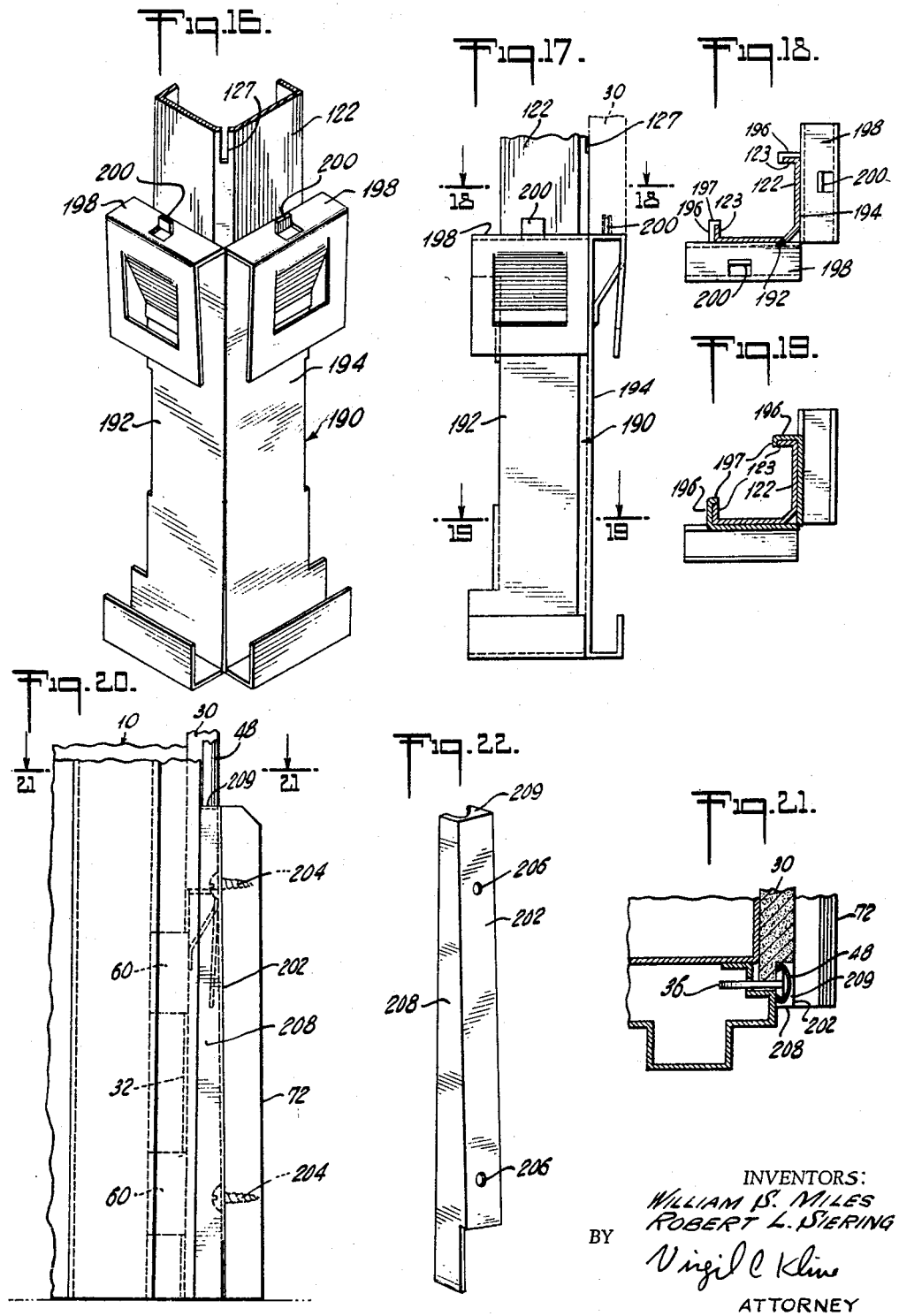

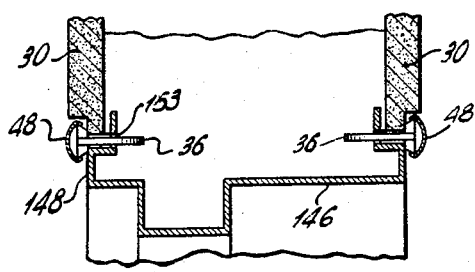
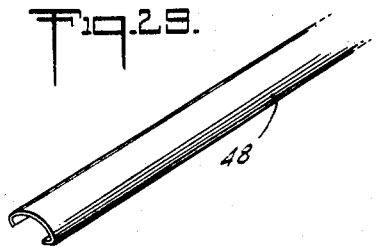
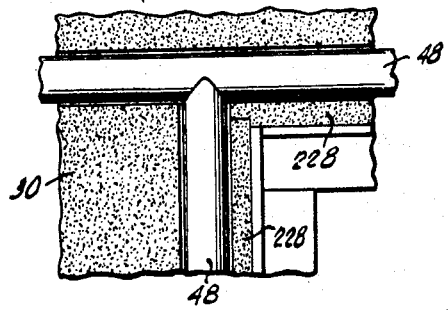
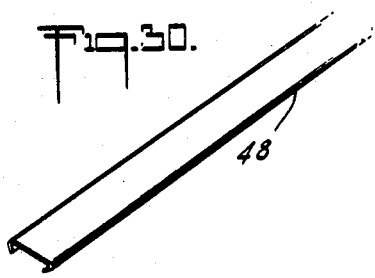

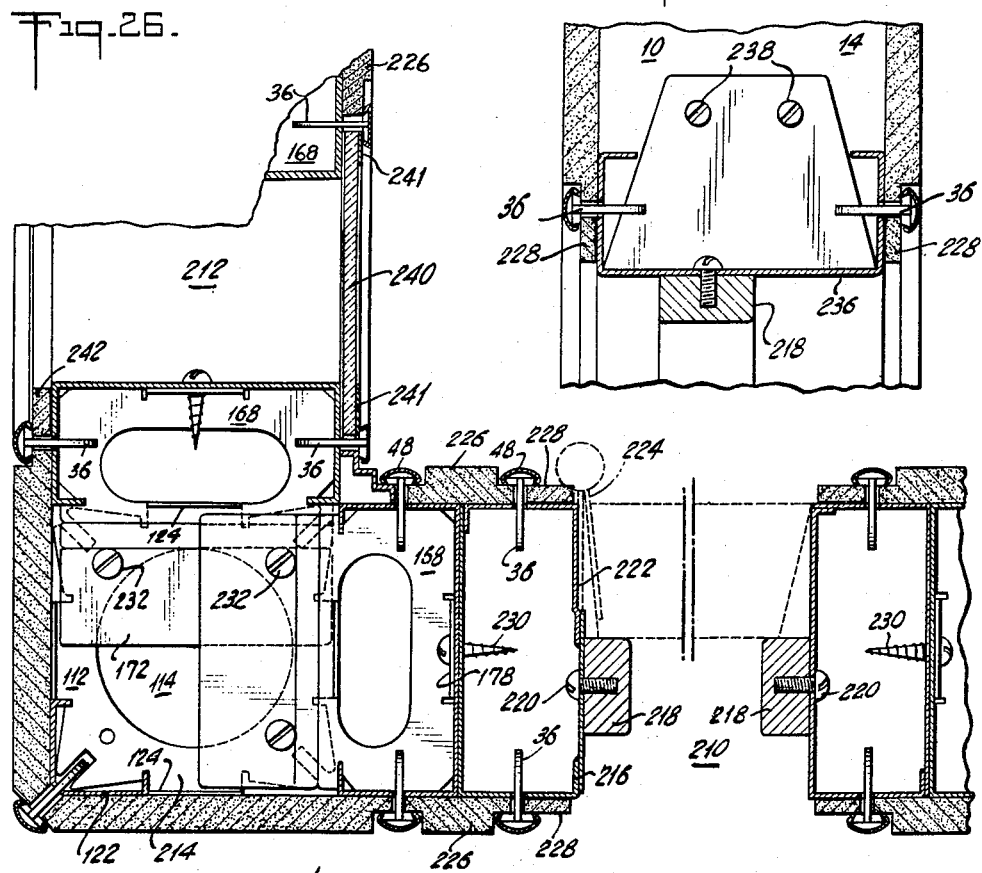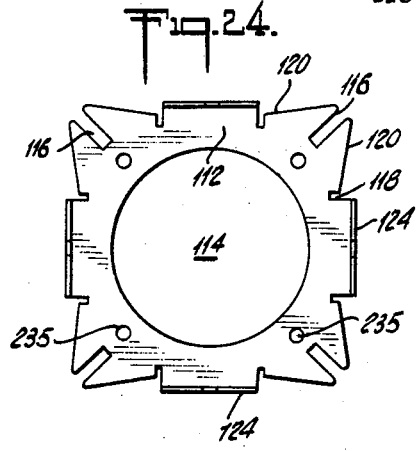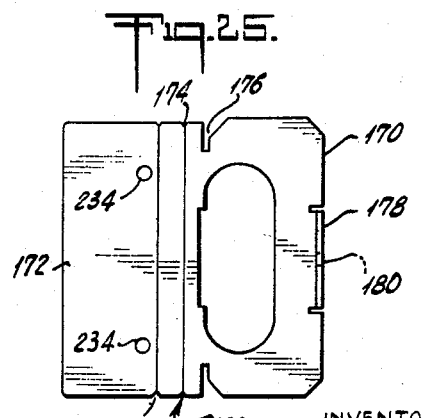

3,008,550
FRAMED OPENINGS FOR WALL ASSEMBLIES
William S. Miles, Hastings on Hudson, and Robert L. Siering, Sea Cliff, N.Y., assignors to Johns-Manville Corporation, New York, N.Y., a corporation of New York
Original application Oct. 22, 1947, Ser. No. 781,334, now Patent No. 2,796,158, dated June 18, 1957. Divided and this application June 3, 1957, Ser. No. 663,192
9 Claims. (Cl. 189—34)

The present invention relates to improved wall assemblies of the kind specially adapted for sub-dividing interior space into individual rooms, offices and the like, and to improved elements for use in the construction and erection of such assemblies. The invention is particularly concerned with constructions for the framing of windows and doors in demountable walls, i.e., walls which may be readily assembled and disassembled to permit the rearrangement or reconstruction of the room structure or to permit the wall to be salvaged for re-use in other locations. The instant invention is especially well adapted for utility in wall assemblies such as disclosed in our co-pending United States patent application Serial No. 781,334, filed October 22, 1947, entitled "Wall Assembly," now Patent No. 2,796,158, of which the instant application is a division.

An object of the invention is the provision of such wall assemblies strong and rigid in character but permitting window and door frames and the like to be readily incorporated in the wall by fastening elements of a type which may also be employed to secure the panels.

Another object of the invention is the construction of a wall system employing simplified parts as compared to known systems of the same general type. For example, it is a particular object of the invention to provide for the securing of glazing panels to members defining the window opening by the same fastening elements which engage the margins of panels surrounding the window opening, and also to provide for the elimination of special framing members around door openings.

The window and door framing constructions which comprise our instant invention will be more fully understood and further objects and advantages will become apparent when reference is made to the more detailed description of preferred embodiments of the invention as employed in a complete wall structure of the type referred to in our above identified co-pending application.

FIG. 1 is a perspective view of a wall assembly in accordance with the instant invention;
FIG. 2 is a sectional view, on an enlarged scale, taken on the line 2—2 of FIG. 1;
FIG. 2a is a sectional view, on an enlarged scale, taken on the line 2a—2a of FIG. 1;
FIG. 2b is a sectional view, on an enlarged scale, taken on the line 2b—2b of FIG. 1;
FIG. 3 is a side elevational view, on an enlarged scale, of a fastening element or clip employed in the instant invention;
FIG. 4 is a rear elevational view of the clip of FIG. 3;
FIG. 5 is a transverse, sectional view of a joint between facing panels illustrating the application of the clip;
FIG. 5a is a sectional view taken on the line 5a—5a of FIG. 5;
FIG. 6 is a sectional view, on an enlarged scale, taken on the line 6—6 of FIG. 1;
FIG. 7 is a side elevational view of a stud employed in the assembly;
FIG. 8 is a detail perspective view, on an enlarged scale, illustrating the upper end of the stud construction of FIG. 7;
FIG. 9 is a detail elevational view of the lower end of one embodiment of the stud looking toward one face thereof;
FIG. 10 is a view similar to FIG. 9 but looking toward the opposite face of the stud;
FIG. 11 is a perspective view of the construction adjacent the lower end of the wall;
FIG. 12 is a sectional view taken on the line 12—12 of FIG. 13;
FIG. 13 is a front elevational view, on an enlarged scale, of the construction shown in FIG. 11;
FIG. 14 is a sectional view, taken on the line 14—14 of FIG. 12;
FIG. 15 is a sectional view, taken on the line 15—15 of FIG. 13;
FIG. 16 is a perspective view of the corner construction adjacent the lower end of the wall;
FIG. 17 is a side elevational view of the construction shown in FIG. 16;
FIG. 18 is a sectional view taken on the line 18—18 of FIG. 17;
FIG. 19 is a sectional view taken on the line 19—19 FIG. 17;
FIG. 20 is a detail end elevational view of a portion of the wall construction at a door opening in accordance with one embodiment of the invention;
FIG. 21 is a sectional view taken on the line 21—21 of FIG. 20;
FIG. 22 is a detail perspective view of a filler element employed in the construction of FIG. 20;
FIG. 23 is a sectional view, on an enlarged scale, taken on the line 23—23 of FIG. 1;
FIG. 24 is a plan view of a holding clip employed in the wall construction;
FIG. 25 is a plan view of a spacer clip employed in the wall construction;
FIG. 26 is a view similar to FIG. 2 but illustrating a modification;
FIG. 27 is a view similar to FIG. 23 but illustrating a modification;
FIG. 28 is a front elevational view of the construction of FIG. 27;
FIG. 29 is a perspective of molding or beading employed as a joint covering strip;
FIG. 30 is a perspective view illustrating a modified construction of the beading.

Referring now to the drawings and first to FIGS. 1–7 inclusive, there is shown a wall or partition assembly employing a plurality of spaced studs 10, each preferably consisting of a channel member including flanges 12 and a web 14. Flanges 12 carry reinforcing reentrant flanges 16. The ends of the studs are carried in base and ceiling runners 18 and 20, respectively, of channel cross-section. The runners extend the length of the wall with the exception that the floor runners are interrupted, as will be understood, at door openings.

The studs may include extensions 22 (see particularly FIGS. 7 and 8), to permit their lengths to be readily adjusted to the ceiling height. The extensions may be secured to the studs proper by bolts 24 extending through elongated slots 26. The flanges 12 of the studs and the corresponding flanges of the stud extensions as well are provided with openings 28 spaced longitudinally thereof and for a purpose later to be described. These openings are preferably enlarged at their upper ends, the sides tapering to form a narrow bight located substantially centrally of the flange.

Facing panels 30 are carried by the studs, the panels forming the wall surfaces. The panels may be any suitable, relatively rigid material, for example, fiber-cement sheets such as asbestos-cement sheets, metal sheets, plastic sheets and the like. The lower edges of the panels are supported against downward movement on members or base clips 32 (see FIGS. 6 and 11–13), later to be described in detail, which are connected to the studs and which include shelf 34 on which the panels rest. The studs are spaced relatively to the panel widths so that adjacent panels form joints on the studs overlying, or substantially overlying, the apex of the V opening in the stud flanges, as best illustrated in FIGS. 2 and 5. For purposes of example it may be stated that conventionally asbestos-cement panels are supplied in 2′ widths and, hence, where such panels are used, the studs are spaced 2′ O-C in straight runs of the wall.

The panels are secured against the studs by clips 36 (see particularly FIGS. 3–5a inclusive), the clips being made of a resilient, springy metal such as spring steel. They include flat body portions 38 of substantial width and narrow arms 39 extending from the upper end of the body portion. The latter consist of straight sections 40 extending rearwardly at substantially right angles to the body portion and reversely curved S-sections 42. The inward bend of the S-section lies relatively close to the body section whereby the clip will resiliently bind the panels to the studs. Projecting rearwardly at the lower end of the body portions is a narrow aligning finger 44. The several elements of the clip are preferably of integral construction, although either the arm or finger, or both, may be separate elements welded to the body portion if desired. The substantial width of the body portion enables it to engage marginal portions of the adjacent panels, the narrower arm and finger extending between the panels (see particularly FIGS. 5 and 5a).

Where facing panels of substantial thickness are used, for example, relatively rigid asbestos-cement panels having a thickness of ⅜″ or greater, the longitudinal edges of the panels are preferably recessed or rabbeted, as illustrated at 37 in FIG. 5, to countersink the body portion of the clip below, or substantially below, the outer surfaces of the sheet. If thinner panels are used, for example, relatively thin, flexible sheets of asbestos-cement or the like as shown at 46 in FIG. 2b, the rabbeting is omitted and the body portions of the clips rest on the outer faces of the panels.

In the use of the clips the panels are laid against a stud in substantially contiguous relationship to each other to form a joint centrally of the stud flange, the panels being separated at the joint sufficiently to permit the arms and fingers of the clips to project between them. A clip 36 then has its arm 39 inserted between the panels opposite the enlarged upper end of one of the openings 28, the arm being projected through the opening until body portions 38 rests on the marginal portions of the panels. The clip is then forced downwardly until it is in the position shown particularly in FIG. 5a with the section 40 of the arm in contact, or substantial contact, with the stud at the lower end of the opening, and with the inwardly curved portion of section 42 in binding engagement with the rear face of the stud flange. The substantially triangular shape of openings 28 expedites thhe insertion of the clips and at the same time insures that the clips, when forced downwardly into final position, will be in alignment centrally of the stud flange. Aligning finger 44 extends between the facing panels at the joint and serves, together with straight section 40 of the spring arm to maintain the body section in exact alignment with the joint (see particularly FIG. 5a). Additional clips are then inserted in a similar manner at the locations of the other stud openings, or at as many of them as is considered necessary under the particular circumstances involved, to secure the panels.

The joint may be concealed by snap-on beading strips 48 of conventional types, the several aligned body portions 38 of the clips forming, in effect, a discontinuous tract to receive the strips. The beading extends longitudinally of the joint, preferably the full height thereof (see particularly FIG. 1). Where relatively thick panels with rabbeted edges are used, the outer face of the beading strips lie substantially in the plane of the panels. The strips may be of any conventional type but preferably for the rabbeted panels, the style shown in FIG. 29 having an outwardly bowed central panel is employed. A flatter strip as illustrated, for example, in FIG. 30, is preferably used where the body portions of the clips project beyond the panel faces (see the inner wall in FIGS. 2b and 26). It will be appreciated that the particular form of the bead may be varied as desired to produce a particular effect.

Referring now to FIGS. 11–15 inclusive, an illustrative embodiment of the supporting members at the base of the wall will be described. The members 32 are made of sheet steel or the like and preferably are of integral construction. Each comprises a body section 50, the upper end of which is bent outwardly at right angles to provide the shelf 34 previously mentioned. Shelf 34 is of a width approximately equal to, but slightly less than, the thickness of the panels 30. A flange 52 extends downwardly from the outer edge of shelf 34. The central portion 53 of flange 52 is struck out and bent rearwardly into contact with the body portion 50, as illustrated best in FIGS. 11 and 12, and welded or otherwise secured to brace the shelf against distortion under the weight of the panel. The cut-out also provides a keeper 54 for cooperation with a fastening element on the baseboard as will be later described. The lower edge of the body portion is bent outwardly to define a section 56 and then upwardly to form a flange 58, the latter also cooperating with a securing element on the baseboard. The width of the outwardly directed section 56 is preferably slightly greater than the thickness of the panel for a purpose later to be described.

Extending rearwardly from both edges of body section 50 are a plurality, preferably a pair, of spaced arms or wings 60 having inturned flanges 62 (see particularly FIG. 15). The lower end of the studs (see FIGS. 9, 10, and 11) are provided with means to receive the inturned flanges. For this purpose the web of the stud is provided with slots 64 and reentrant flanges 16 are provided with notches 66 opposite the slots. In assembling a base member on a stud the inturned flanges of arms 60 which lie adjacent the web of the stud are inserted in the slots 64. The support member is then swung around and forced into its final position, the inturned flanges of arms 60 on the other side of the stud snapping into positions within notches 66. As shown particularly in FIG. 12, slot 64 and notches 66 are made of substantially greater length than the width of arm 60 to provide for substantial adjustment of the support members.

In order to insure engagement of the lower edge of the panels against the studs and to prevent their shifting out of alignment, the panels are preferably provided with grooves 68 in their lower edges to receive tangs 70 extending upwardly from shelves 34. Suitably the tangs are struck up from the metal of the shelf.

Members 32, in addition to supporting the panel members against downward movement, cooperate with attaching means carried by baseboards 72. The baseboards which may be made of any suitable slab material, preferably asbestos-cement or the like, extend from the floor level to a point above the lower edge of the facing panels in accordance with conventional practices. They are secured to supporting members 32 by elements 74 (see particularly FIGS. 12 and 14), the latter comprising strips of springy metal secured to the baseboards, as for example by screws 76. The upper end of the strip is reversely bent to define a downwardly directed leg 78 adapted to extend through the opening in flange 52 and resiliently engage against the rear face of keeper 54. The lower ends of the strips are provided with outwardly and downwardly directed legs 80 adapted to engage behind flanges 58 at the lower edges of the supporting members. Legs 78 and 80 are bent backwardly toward the elements with which they respectively engage to hold the baseboard in position under spring tension. Due to the construction of shelf 34 of somewhat less width than the facing panel and of flange 56 of greater width, baseboard 72 is supported at a slight angle which insures the engagement of its upper, inner edge against the panels to provide a finished appearance and avoid unsightly cracks.

Referring now again to FIGS. 1, 2, and 2b, provision is made for corners and for intersecting walls. Considering first the corner construction illustrated in detail in FIG. 2, studs 111 which are identical with studs 10 employed in straight runs of the wall are arranged at the corner with their webs in intersecting planes and with their flanges directed away from the corner. The studs are secured together by a plurality of vertically spaced holding clips 112 (see particularly FIG. 24).

The holding clips are constructed for universal application, that is, for use in corners turning in either direction and for the wall intersections to be later described. The clips have central apertures 114 to permit the passage of wiring and other service lines. Each corner of the clip is provided with an inwardly and diagonally directed, relatively deep notch 116 adapted to receive the arm 39 of a panel securing clip 36. Adjacent the corners are notches 118, the sides 120 of the clips slanting inwardly from the corners to, say, one-half the depth of the notches 118. This construction provides for the reception of corner strip 122. Upwardly directed flanges 124 are provided intermediate the corners of the holding clip, the flanges being perforated to receive sheet metal screws 126 or other attaching devices to secure the studs to the holding clip.

Further details of the corner construction, which are disclosed in our aforesaid co-pending application will not be described in the instant application, since they have no direct relation to the instant invention and are readily apparent from the drawing, and since a complete understanding of these details is moreover not necessary to an understanding of the present invention.

Referring now particularly to FIG. 2b, a wall intersection is illustrated. A plurality of vertically spaced holding clips 112, of the type previously described, connect two studs 10 of the straight running wall, the studs being placed back to back and spaced apart a distance equal to the width of the web of an end stud 10 of the intersecting wall. The several studs are secured together through the medium of the holding clips by sheet metal screws 126 passing through flanges 124 of the clips and the webs of the studs.

It will be appreciated that the junctions of the facing panels of the intersecting wall with the facing panels 30 of the straight running wall involve the same problem as the inner corner construction illustrated in FIG. 2, and the problem is solved in the same way. Filler strips 134 are inserted at the inner corners defined by the intersecting wall with the straight wall and clips 36 are used to secure the marginal edges of the facing panels of both walls and the clips to the studs.

As previously mentioned the facing panels may be either of substantial thickness and rabbeted at the edges to accommodate the securing clips 36 or may be of less thickness to permit the body portions of the securing clips to rest directly on the outer faces of the panels. FIG. 2b illustrates such variation, as well as the case where thinner facing panels are used in one section of the wall and thicker panels in the other. It will be quite clear that no erection problems whatsoever are raised by such requirements.

Provision is made for the insertion of door and window openings in accordance with the instant invention, as illustrated at 138 and 140, respectively, in FIG. 1. Referring now particularly to FIGS. 2 and 23, the door frame construction will first be described. The door frame consists of a butt side buck 142 and a strike side buck 144 connected at the top by horizontal frame member 146. Each of these elements has stepped edges 148 with the outer steps 149 in alignment with the planes of the marginal portions of the facing panels on opposite side of the wall, and with the inner steps 151 approximately in alignment with the planes of the inner faces of the facing panels. The inner steps of the door buck also include inner flanges 150 welded or otherwise secured to members 152 which may in all respects be similar to studs 10 but which, in this case, serve only as reinforcing and supporting elements for the bucks. The inner steps of both the vertical and horizontal frame members are provided with spaced slots 153 in line with the joints between the adjacent facing panels and the outer steps, the slots being of a width and length to receive the arms 39 of the panel securing clips 36. The door frame is secured in the assembly by the spring clips, the arms 39 extending between the edges of the panels and the stepped edges of the bucks and horizontal frame member and through slots 153 and into engagement behind the inner steps.

FIGS. 2a and 6 illustrate a construction for a double window with an intervening mullion. The window frames consist of similar vertical and horizontal frame members 158 and 160, respectively, including stepped edges having outer steps 162 in line with the planes of the marginal portions of the facing panels and inner steps 164 substantially in line with the planes of the inner faces of the facing panels. The inner step of each of the frame members is provided with spaced slots 165 of corresponding size and position to slots 153 of the door frame members. Inasmuch as the windows are normally of lesser width than the standard facing panel, means are provided for spacing the frames from the regular studs 10.

The spacing means comprise spacer clips 168 (see FIG. 25 for details of the clips), each spacer clip consisting of a main section 170 and an extension 172. Extension 172 is provided with edge notches 174 at spaced points to define break-off lines whereby the clip may be shortened to permit its use in different situations. Section 170 is separated from extension 172 by notches 176 adapted, where necessary, to receive reentrant flanges 16 of the studs as will later be more fully explained. Section 170 also includes an upwardly extending flange 178 formed with an aperture 180 to receive a holding screw or the like.

Referring first to the left-hand one of the pairs of windows, it will be seen that a spacer clip 168 is secured to the web of stud 10 by screw 182 passing through the aperture 180 of flange 178 and threaded into the stud. The spacer clip is broken off at the inner break-off line in this instance, as only this much of the clip is needed and the end of the clip is inserted between the inner steps of the frame. It will be understood that a plurality of the spacer clips is used, the spacer clips being situated at intervals along the studs. At the mullion intermediate the windows a central stud 10, which extends the full height of the wall, carries spacer clips 168, those at the left of the stud being broken off similarly as the clips on the opposite side of the window. The spacing clips 168 on the right side of the stud are oppositely directed and, in this case are of full length, section 170 being inserted between the flanges of the stud with the reentrant flanges 16 entering notches 176 and extension section 172 projecting between the inner steps 164 of the frame member of the right-hand window. On the opposite side of the right-hand window the structure is identical with that employed for the corresponding side of the left-hand window, spacer clips 168 being secured to a stud 10 and projecting between the inner steps of the frame member. Narrow facing panels 184 and 186, respectively, span the spaces between the stud 10 at the center of the mullion and the adjacent frame members of the two windows. Similarly narrow facing panels 166 and 188 span the spaces between the frame members at the outer sides of the windows and the adjacent studs 10. The facing panels are secured by clips 36 with their arms passing through the joints between the panels or between the panels and the frame members and through the openings in the stud or openings 165 in the inner steps of the frame members. The horizontal elements 160 of the window frames have the same stepped edges as the vertical members, as previously pointed out, and the horizontal edges of the facing panels above and below the window are secured thereto by clips 36 in the same manner that the vertical edges of the other panels are secured to the vertical members of the window frame. As will be understood the facing panels below the windows support the weight of the window frames and sash.

Where a single window is to be included in the wall, for example window 141 (see FIGS. 1 and 2), the operations are similar to those described above, the arrangement of the spacers and other elements being the same as for the outer sides of the double window.

Referring now to FIGS. 16–22 inclusive, the construction of base clips and auxiliary members at the corners and at door openings and the like will be described. The base clip 190, illustrated particularly in FIGS. 16–19, inclusive, may consist of two, preferably integrally joined sections 192 and 194 lying at right angles to each other, and each of similar construction to member 32, except that only the outer edges of the sections are provided with arms 196 with inturned flanges 197. The sections each include a shelf 198 with an upstruck tang 200. The member is applied to the corner strip 122 by snapping it into position, flanges 197 engaging the edges of flanges 123. The facing panels which meet at the corner to form a joint thereon, as illustrated in FIG. 2, rest on the shelves 198 with tangs 200 entering the slots in the panel edges to maintain the panels in contiguous relationship at the corner. The baseboards are secured on the base clips in the same way previously described for the straight run construction, the baseboards suitably forming a butt joint or a mitre joint, as desired.

At the door openings, the baseboard 72 is continued substantially to the inner edge of the door frame (see FIG. 21) in substantial alignment with the edge of the beading overlying the clips securing the ends of the panels to the frame members. The beading 48 terminates approximately at, but preferably slightly below, the upper edge of the baseboard, inasmuch as no panel securing clips are used below that point and, hence, if it was continued its end would be unsecured. To fill the remaining space, a filler element 202 (see FIGS. 20 and 22) is secured to the inner side of the baseboard at the end thereof as by screws 204 passing through perforations 206. The filler strip includes a side flange 208 extending to the door frame member and top flanges 209 having a cut-out to fit around the beading.

Referring now to FIGS. 26, 27, and 28, a modified construction for door and window openings which do not require separate framing members as in the previous form, will be described. FIG. 26 is a horizontal section taken for convenience through a wall including door opening 210 and window opening 212, the window and door lying in intersecting walls defining a corner 214. Referring first to the door opening, a modified stud is employed at this location, the stud in its simplest form consisting of the web and a flange of each of two studs welded together to form, in effect, a box stud 216 which, in addition to its normal function, serves as the door buck or framing member. Conventional door stops 218 are secured to the box studs as by screws 220, the stops being attached before the bucks or box studs are assembled. The box stud on the butt side will have embossed or depressed portions 222 to accommodate the leaves of the hinges 224. Narrow facing panels 226 extend between the next adjacent studs and the box stud opening, the narrow panels being secured by the panel securing clips 36. Thin strips of facing material 228 are cemented to the box studs or bucks adjacent the door opening, the strips having a thickness equal to the marginal portions of the adjacent panels 226 whereby they provide a seat for the body portions of the clips 36 and, in addition, provide a finished appearance to the door opening (see FIG. 28). The box studs are secured against movement by spacer clips 168 of the type previously described. Screws 230 pass through the flanges 178 of the spacer clips and the webs of the studs 10 and adjacent box stud or door bucks. In the construction shown in FIG. 26 where the door is adjacent a corner, the spacer clips on the corner side are of full length and section 172 extends into the corner and is secured to the holding clip 112 by screws 232 passing through preferably preformed perforations 234 and 235 of the spacer and holding clips, respectively.

The door header, illustrated in FIG. 27, comprises simply a section 236 of the same material used for studs 10, the section carrying a door stop 218. The ends of the web are bent upwardly and secured by bolts or screws 238 to the webs of the adjacent studs 10, the header overlying the ends of the box studs. Narrow strips 228 are cemented along the edges of the header and the facing panels above the door opening are secured to the header by clips 36.

In the window construction, the glazing panel 240 covers the opening at one side of the wall and is secured by clips. In other words, the glass is merely substituted for the normal facing panel at one side of the wall. At the opposite side narrow strips 242 of the facing panel material of the same thickness as the marginal portions of the regular facing panels are cemented to the studs and to the horizontal frame members (not shown) at the edges of the window opening, and clips 36 engage the margins of the facing panel and the strips. The margins of the glazing panel are preferably covered by a thin strip 241 of rubber or the like. It will be appreciated that at both sides of the window the studs are turned so that their webs are toward the window opening. Where the window is located adjacent a corner as shown, stud 10 is tied into the corner structure by a spacer clip 168; where a corner is not located closely adjacent thereto, the glazing panel 240 forms a joint with a facing panel with clips 36 engaging the margins of the facing panel and the glazing panel, as described herein.

The wall constructions described above, including the window and door framing constructions of the present invention, are strong and rigid when assembled, yet can be easily and quickly erected and later altered or moved without destroying or materially reducing the value of any of the parts. The window and door frame elements and the like may be readily incorporated in the wall by fastening elements of a type which may also be employed to secure the panels. It will thus be seen that the objects of the invention as stated above are obtained by a construction as disclosed.

Although we have described our invention in rather full detail, it will be understood that these details need not be strictly adhered to but that various changes and modifications may suggest themselves to one skilled in the art, all falling within the scope of the invention as defined by the subjoined claims.

What we claim is:

1. In a wall assembly having an opening therein, frame members around said opening, each of said members having a stepped edge, said edge defining an outwardly directed flange, apertures in said flanges, facing panels having marginal portions overlying said flanges and defining joints with said stepped edges, and clips, each including a body portion resting on one of said marginal portions and said stepped edge and having an arm extending through the joint and aperture and into gripping engagement with the rear face of the flange, said facing panels and clips assisting to maintain, at least in part, said flanges and frame members in position to define said opening.

2. In a wall assembly having an opening therein, frame members around said opening including at least one channel member as a generally vertical component having its web directed toward said opening, a generally vertical stud generally parallel to said channel member, spacer clips spaced longitudinally of said stud and channel member, and means detachably securing said clips to said stud and channel member to hold said channel member in its erected position relative to said stud, and a facing panel held in assembled position on said stud and channel member at least in part by said means.

3. A wall assembly as defined in claim 2, said channel member having a leg defining a flange directed outwardly from said opening and web, said flange having apertures therein, said facing panel having a marginal portion overlying said flange and defining a joint on said leg, and said means comprising clips, each including a body portion overlying at least in part said marginal portion and said flange and having an arm extending through the joint and aperture and into gripping engagement with the rear face of said flange.

4. A wall assembly as defined in claim 2, said channel member having a stepped edge, said edge defining a flange directed outwardly from said opening and web, said flange having apertures therein, said facing panel having a marginal portion overlying said flange and defining a joint with said stepped edge, and said means comprising clips, each including a body portion overlying at least in part said marginal portion and said stepped edge and having an arm extending through the joint and aperture and into gripping engagement with the rear face of said flange.

5. In a wall assembly having an opening therein, framing members including channel sections having flanges and webs with the webs defining the walls of the opening, apertures in said flanges, facing panels having marginal portions overlying said flanges and terminating adjacent said openings, strip material overlying said flanges and defining a joint with said marginal portions, and clips, each including a body portion resting on a marginal portion and the strip material and having an arm extending through the joint therebetween and an aperture and into gripping engagement with the rear face of the flange.

6. In a wall assembly having a door opening therein, a stud, a door buck carried by said stud and having a stepped edge, said edge defining a flange, a facing panel resting on said stud and having a marginal portion overlying said flange and defining a joint with said stepped edge, an aperture in said flange opposite said joint, and a clip including a body section overlying the marginal portion of said facing panel and said stepped edge and having an arm extending through said joint and said aperture into gripping engagement with the rear face of the flange, said clip and said facing panel assisting, at least in part, to maintain said door buck in place.

7. In a wall assembly having a window opening therein, a stud, a window frame member spaced from said stud and having a stepped edge, said edge defining a flange, a spacer connecting said frame member and stud, a wall panel having a marginal edge overlying said flange and defining a joint with said stepped edge, an aperture in said flange in line with said joint, and a clip including a body section overlying said marginal edge and said stepped edge and having an arm extending through said joint and said aperture into gripping engagement with the rear face of the flange, said clip and said wall panel assisting, at least in part, to maintain said window frame member in place.

8. In wall assembly, a window opening therein, framing members including channel sections having flanges and webs with the web defining the walls of the opening, apertures in said flanges, facing panels having marginal portions overlying said flanges at one side of said wall and terminating adjacent said openings, a glazing panel covering said opening and overlying said flanges and defining a joint with said facing panels, and clips, each of said clips including a body portion resting on the marginal portions of said facing panels and a glazing panel at a joint therebetween and having an arm extending through the joint and an aperture and into gripping engagement with the rear face of the flange.

9. In a double-faced wall assembly, a window opening therein, framing members including channel sections having flanges and webs with the webs defining the walls of the opening, apertures in said flanges, facing panels on both faces of said wall and having marginal portions overlying said flanges and terminating adjacent said apertures, strip material on one face of said wall overlying said flanges and forming joints with said marginal portions and terminating adjacent said opening, clips, each including a body portion resting on the marginal portions and strip and having an arm extending through the joint therebetween and the aperture and into gripping engagement with the rear face of the flange, a glazing panel covering said opening at the opposite face of the wall and overlying said flanges and defining joints with the facing panels on said opposite face of the wall, and clips, each including a body portion resting on marginal portions of the facing panel and glazing panel at a joint and having an arm extending through the joint and aperture and into gripping engagement with the rear face of the flange.

References Cited in the file of this patent

UNITED STATES PATENTS

| | | |
|---|---|---|
| 1,923,906 | Berger | Aug. 22, 1933 |
| 2,313,839 | Olsen | Mar. 16, 1943 |
| 2,317,634 | Olsen | Apr. 27, 1943 |